United States Patent
Wilhelm et al.

(10) Patent No.: US 8,477,418 B2
(45) Date of Patent: Jul. 2, 2013

(54) CONFOCAL LASER MICROSCOPE

(75) Inventors: Stefan Wilhelm, Jena (DE); Dieter Huhse, Berlin (DE)

(73) Assignee: Carl Zeiss Microscopy GmbH, Jena (DE)

(*) Notice: Subject to any disclaimer, the term of this patent is extended or adjusted under 35 U.S.C. 154(b) by 512 days.

(21) Appl. No.: 12/522,288

(22) PCT Filed: Feb. 9, 2008

(86) PCT No.: PCT/EP2008/001003
§ 371 (c)(1),
(2), (4) Date: Jul. 7, 2009

(87) PCT Pub. No.: WO2008/101605
PCT Pub. Date: Aug. 28, 2008

(65) Prior Publication Data
US 2010/0027108 A1 Feb. 4, 2010

(30) Foreign Application Priority Data
Feb. 21, 2007 (DE) .......................... 10 2007 009 660

(51) Int. Cl.
*G02B 6/32* (2006.01)
*G02B 21/06* (2006.01)

(52) U.S. Cl.
USPC ................................ 359/385; 385/33; 385/93

(58) Field of Classification Search
USPC ............... 359/368, 385–390; 385/33, 79, 88, 385/93
See application file for complete search history.

(56) References Cited

U.S. PATENT DOCUMENTS

| | | | | |
|---|---|---|---|---|
| 4,530,578 A * | 7/1985 | Kato | .............................. | 359/381 |
| 5,323,009 A * | 6/1994 | Harris | ......................... | 250/458.1 |
| 5,659,642 A * | 8/1997 | King et al. | ....................... | 385/16 |
| 6,167,173 A * | 12/2000 | Schoeppe et al. | ................ | 385/33 |
| 6,486,458 B1 * | 11/2002 | Schoeppe et al. | ............. | 250/205 |
| 6,749,346 B1 * | 6/2004 | Dickensheets et al. | ......... | 385/88 |
| 7,170,676 B2 * | 1/2007 | Aono | ............................. | 359/388 |
| 7,330,305 B2 * | 2/2008 | Harris | ............................ | 359/368 |

(Continued)

FOREIGN PATENT DOCUMENTS

| | | |
|---|---|---|
| DE | 197 02 753 | 7/1998 |
| DE | 198 29 988 | 1/2000 |
| DE | 103 61 176 | 7/2005 |
| EP | 1 686 407 | 8/2006 |

OTHER PUBLICATIONS (http://www.zeiss.de/c12567be00459794/Contents-Frame/fd9a0090eee01a641256a550036267b).

*Primary Examiner* — Frank Font
(74) *Attorney, Agent, or Firm* — Frommer Lawrence & Haug LLP

(57) ABSTRACT

A confocal laser microscope has at least one laser whose illumination light is transmitted in direction of the microscope objective by at least one light-conducting fiber. The light-conducting fiber can be plugged in at a housing which preferably comprises the scanning head of the microscope, and a holder is provided which can be plugged into the housing and into which the light-conducting fiber projects and which is provided at its end remote of the fiber with first optics for transmitting the laser light exiting divergently from the fiber in direction of at least partially displaceable collimating optics in the housing. At least second optics are advantageously arranged between the first optics and the collimating optics.

14 Claims, 4 Drawing Sheets

U.S. PATENT DOCUMENTS

| | | |
|---|---|---|
| 7,592,582 B2 * | 9/2009 | Mikuriya et al. .............. 250/216 |
| 7,835,601 B2 * | 11/2010 | Seyfried et al. ................. 385/14 |
| 2003/0034431 A1 * | 2/2003 | Mandella et al. .......... 250/201.3 |
| 2004/0196549 A1 * | 10/2004 | Aono ............................ 359/388 |
| 2005/0249457 A1 | 11/2005 | Seyfried et al. |
| 2011/0178409 A1 * | 7/2011 | Harris et al. .................. 600/476 |

* cited by examiner

PRIOR ART

US 8,477,418 B2

CONFOCAL LASER MICROSCOPE

The present application claims priority from PCT Patent Application No. PCT/EP2008/001003 filed on Feb. 9, 2008, which claims priority from German Patent Application No. DE 10 2007 009 660.9 filed on Feb. 21, 2007, the disclosure of which is incorporated herein by reference in its entirety.

BACKGROUND OF THE INVENTION

1. Field of the Invention

The current application relates to a confocal laser microscope with at least one laser whose illumination light is transmitted in direction of the microscope objective by at least one light-conducting fiber.

2. Description of Related Art

Laser scanning systems use lasers of different power classes. Further, a laser scanning system is characterized by a large quantity of variable modules serving as detectors or for illumination.

A confocal scanning microscope contains a laser module which preferably has a plurality of laser beam sources generating illumination light of different wavelengths. A scanning device into which the illumination light is coupled as illumination beam has a main color splitter, an X-Y scanner, and a scanning objective for guiding the illumination beam by beam deflection over a sample located on a microscope stage of a microscope unit. A measurement light beam which is generated in this way coming from the sample is directed to at least one confocal detection diaphragm (detection pinhole) of a detection channel by a main color splitter and imaging optics.

FIG. 1 is schematic diagram showing this type of beam path of a laser scanning microscope. As is shown, the modules are a light source, scan module, detection unit, and microscope. These modules are described in more detail in the following. In addition, reference is had to DE19702753A1.

Lasers of different wavelengths are used in a LSM for specific excitation of the different dyes in a specimen. The choice of excitation wavelength is governed by the absorption characteristics of the dyes to be examined. The excitation beam is generated in the light source module. Different lasers (argon, argon-krypton, TiSa) are used for this purpose. Further, the selection of wavelengths and the adjustment of the intensity of the required excitation wavelength are carried out in the light source module, e.g., by means of an acousto-optical crystal. Subsequently, the laser radiation reaches the scan module through a fiber or a suitable mirror arrangement.

The laser radiation generated in the light source is focused in the specimen in a diffraction-limited manner by means of the objective via the scanner, the scan optics and the tube lens. The focus scans the specimen point by point in the X-Y direction. The pixel dwell times during the scan over the sample are usually in the range of less than one microsecond to several hundred microseconds.

In case of a confocal detection (descanned detection) of fluorescent light, the light which is emitted from the focus plane (specimen) and from the planes above and below the latter travels to a dichroic beamsplitter (MD) by way of the scanner. This dichroic beamsplitter separates the fluorescent light from the excitation light. The fluorescent light is subsequently focused on a diaphragm (confocal diaphragm/pinhole) which is located exactly in a plane conjugate to the focus plane. Fluorescent light located outside the focus is suppressed in this way. The optical resolution of the microscope can be adjusted by varying the aperture size. Another dichroic blocking filter (EF) which again suppresses the excitation radiation is located behind the diaphragm. After passing the blocking filter, the fluorescent light is measured by a point detector (PMT).

When multiphoton absorption is used, the excitation of the dye fluorescence takes place within a small volume in which the excitation intensity is especially high. This area is only negligibly larger than the detected area when using a confocal arrangement. Therefore, a confocal diaphragm can be dispensed with and detection can be carried out directly after the objective (non-descanned detection).

In another arrangement for detection of a dye fluorescence excited by multiphoton absorption, descanned detection is carried out, but this time the pupil of the objective is imaged in the detection unit (non-confocal descanned detection).

In a three-dimensionally illuminated image, both detection arrangements in connection with the corresponding single-photon or multiphoton absorption will display only the plane (optical section) located in the focus plane of the objective. A three-dimensional image of the sample can then be generated with the help of a computer by recording a plurality of optical sections in the X-Y plane at different depths Z of the sample. Accordingly, the LSM is suitable for examining thick specimens. The excitation wavelengths are determined by the dye employed with its specific absorption characteristics. Dichroic filters suited to the emission characteristics of the dye ensure that only the fluorescent light emitted by the respective dye will be measured by the point detector.

Currently, in biomedical applications a plurality of different cell regions are labeled simultaneously by different dyes (multiflourescence). In the prior art, the individual dyes can be detected separately based either on different absorption characteristics or on emission characteristics (spectra). For this purpose, an additional splitting of the fluorescent light of a plurality of dyes is carried out by the secondary beamsplitters (DBS) and the individual dye emissions are detected separately in separate point detectors (PMT x).

A very fast line scanner with image generation at 120 images per second is realized in the LSM LIVE by Carl Zeiss MicroImaging GmbH. (http://www.zeiss.de/c12567be00459794/Contents-Frame/fd9a0090eee01a641256a550036267b).

As a rule, the light source modules are connected to the scan module by light-conducting fibers.

It is known from DE19702753A1 to provide displaceable collimating optics for coupling the laser light from the light guide outputs into the microscope beam path. For example, a movable collimator which compensates for the longitudinal chromatic aberration of the objective being used is arranged behind the plug-in glass fiber input coupling of the UV (or 405 nm) illumination so that the focus points of UV and visible light again lie in a plane. The movable collimator is moved into another position for every objective.

Static collimating lenses in the fiber-optic plug are mentioned in DE10361176 A1.

For purposes of transporting, when replacing defective fibers, and possibly for coupling in other lasers, there is a need for a glass fiber input coupling which can be unplugged and then plugged in again without adjustment.

DE 19829988 discloses an adjustment of fibers in more than one spatial direction, but this is relatively complicated.

There are technical problems which arise from the demand for fibers which do not require adjustment: A standard single mode glass fiber, e.g., for the wavelength of 405 nm, typically has a mode field diameter of 3.5 µm and a numerical aperture of 0.1. For purposes of plugging in in a reproducible manner without requiring adjustment, this means that this fiber must be positioned with a positioning accuracy of appreciably less than 1 µm for repeatedly plugging in at the scanning head, while the angular accuracy need only be in the range of 10 mrad. To ensure the lateral superposition of different wavelengths which are directly coupled into the scanning head separately by means of fibers and to ensure the positioning accuracy of the laser beam with respect to the system pupil, the reproducibility of a simple glass fiber plug-in connection must be appreciably better than 1 µm, which realistically cannot be implemented at a reasonable expenditure on mechanical adjustment.

SUMMARY OF THE INVENTION

The current application relates to a confocal laser microscope with at least one laser whose illumination light is transmitted in direction of the microscope objective by at least one light-conducting fiber. In this confocal laser microscope, the light-conducting fiber can be plugged in at a housing which preferably comprises the scanning head of the microscope. In addition, a holder is provided which can be plugged into the housing and into which the light-conducting fiber projects. This holder is provided, at its end remote of the fiber, with first optics for transmitting the laser light exiting divergently from the fiber in direction of at least partially displaceable collimating optics in the housing.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
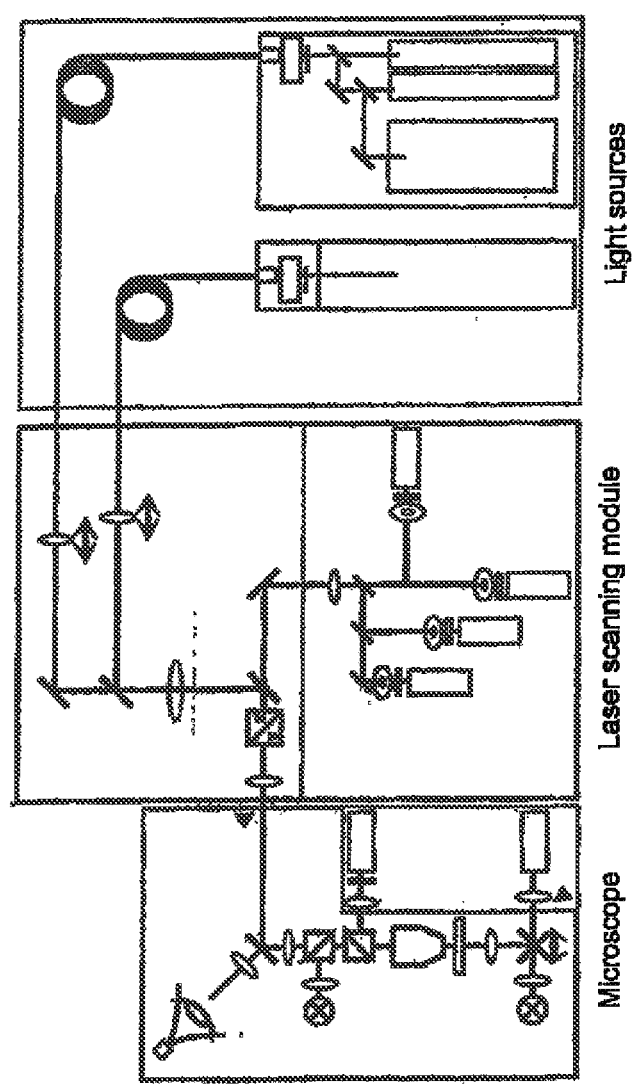
FIG. 1 is schematic diagram showing a type of beam path of a laser scanning microscope according to the prior art.
Figure 2:
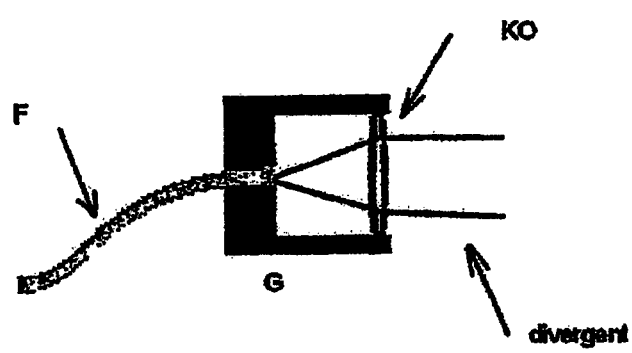
FIG. 2 shows a collimation according to an embodiment of the invention.

According to the invention, a two-lens or three-lens collimation (with movement of the final lens) is used instead of collimation by means of only one displaceable lens. A basic construction is shown in FIG. 2.

Instead of plugging the fiber directly into the scanning head, a compact (plug-in) unit comprising fiber F and lens L1 mounted in a housing G so as to be fixedly connected to one another is plugged in.

Fiber F is held so as to be stationary in the housing which has a mount for a lens L1.

Figure 3:
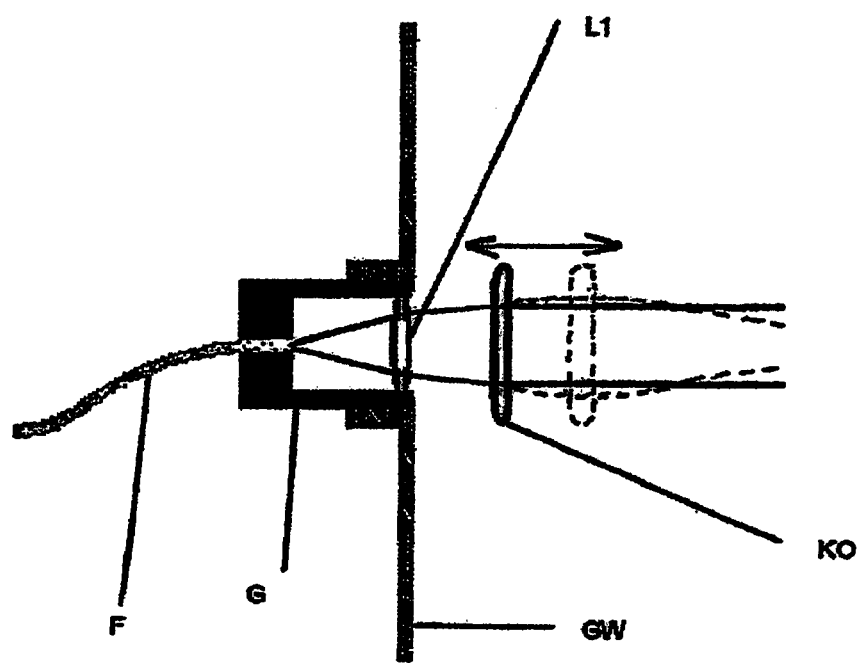
FIG. 3 shows a collimation according to another embodiment of the invention.

For example, the glass fiber in this plug could have a mode field diameter of 3.5 µm and a numerical aperture of 0.1. The lens could have a focal length of f=15 mm and could be at a distance of 10 mm from the end of the fiber so that the beam exits from the lens non-parallel to an emission angle. In this case, the numerical aperture of the output beam would be approximately 0.0333. In other words, the lens is slightly defocused. This plug can now be plugged in at the housing wall GW of the scanning head of the LSM in which a movable collimator (lens KO) is located, as was described above. This is shown in FIG. 3.

This collimating lens could then have a focal length of f=50 mm, for example, and be located in the "zero position" at 20 mm behind the plug lens L1.

This zero position corresponds to an intermediary position (determined computationally, for example) around which the lens KO can be displaced.

In this position, there would be a parallel beam behind the collimator. This means that a collimated beam is first obtained by means of the two-stage system comprising a first positive lens which is fixedly connected to the fiber and a displaceable second positive lens which is arranged in the device. This arrangement is advantageous above all in that two lenses are cleverly arranged in such a way that plugging in and unplugging is possible in the infinity beam because the tolerances are substantially looser than when plugging in and unplugging a single mode fiber in the focus of a positive lens. The lens focal lengths that are used can also be different. The focal length of the first lens primarily determines the sensitivity of the plug-in process. A focal length that is too long adversely affects the stability of the system. In relation to the core diameter for single mode transmission in the wavelength region between 355 nm and 675 nm, which is chiefly considered in the present case, the core diameter is between 2 µm and 4 µm. The focal length of the first lens is then ideally between 10 and 15 mm. The focal length of the second lens then depends on which beam diameter must be achieved behind the second lens in case of collimation. The two-stage system as a whole must be selected such that an optimal attachment to the system in the scanning head can be ensured for the collimated beam.

By displacing the collimator, the longitudinal chromatic aberration of the objectives can now be compensated so that the focus point of the different colors in the object are again located in a plane.

Because the first lens is fixedly connected to the end of the fiber, this plug now acts as though a glass fiber with a larger mode field diameter and a smaller aperture were located in this plug. This lowers the requirements for the positioning accuracy of this plug compared to a plug which only holds the fiber. In the example mentioned above, the requirements for positioning accuracy have been lowered by a factor of three. On the other hand, the requirements with regard to the angle have been made stricter by the same factor (the emission angle is reduced by L1), but in this case there is advantageously more leeway in technical respects with regard to manufacturing.

The optimal value for the focal lengths and positions of the respective lenses must be recalculated computationally in each instance depending on the application, the required path traveled by the collimator, possible manufacturing tolerances of the plugs and sockets, and the general design requirements. The values given above serve only as examples.

While the two-stage system makes an improvement possible, the requirements for spatial alignment are still high. Instead of 0.5 µm in the single-stage construction, 1.5 µm must now be achieved with the values indicated by way of example.

In order to achieve a truly significant loosening (e.g., factor of 100) of the tolerances for positioning accuracy, relatively impracticable values for the individual focal lengths or distances are necessary. The first lens could have a focal length of 15 mm, for example, and could be at a distance of 14.85 mm from the fiber. The second lens would then have a focal length of 2000 mm, for example, and would be at a distance of 515 mm from the first lens in the zero position.

Figure 4:
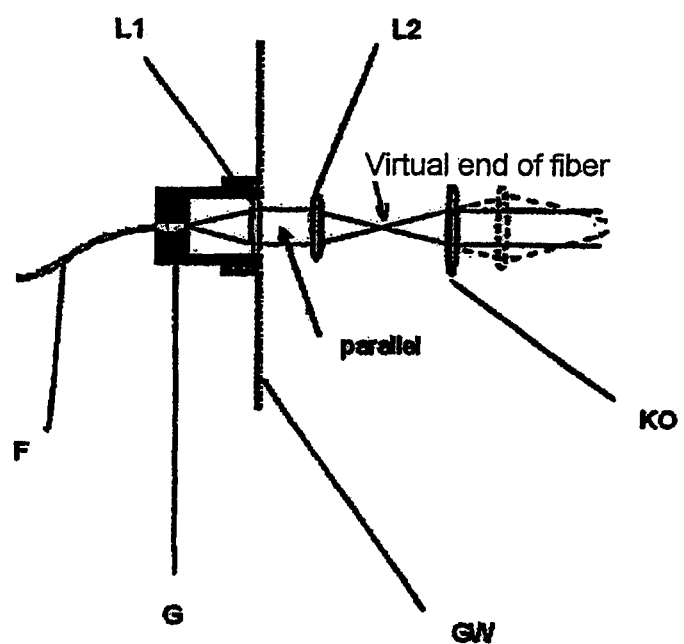
FIG. 4 shows a three-stage collimation according to yet another embodiment of the invention.

This could be improved in an advantageous manner by means of a three-stage collimation which is illustrated in FIG. 4.

In this case, the plug is constructed in such a way that a parallel beam exits from the plug itself (that is, for example, f=5 mm with a distance of 5 mm between the fiber and lens L1 in focal length=5 mm).

A second, preferably stationary, lens L2 (for example, exactly the same as that in the plug) is located in the housing itself. By means of these two lenses L1, L2, the end of the fiber is imaged on a location in the housing; 5 mm behind the second lens L2 in the present example. The third lens is now again the movable collimator KL which can be designed, for example, with a focal length of f=10 mm depending on the requirements of the rest of the optics.

The advantage of this arrangement is that the requirements for the positioning accuracy of the plug are very greatly reduced because a parallel light beam exits from the plug.

In summary, the invention is directed to:
the combination of movable collimators with a fiber plug in which the glass fiber is fixedly connected to a lens; and
the combination of fiber collimators (with parallel beam path at the output) with two-stage collimating optics with a movable collimator.

The specific values for the focal lengths and distances may vary within the framework of the invention.

Depending on the required imaging quality, a wide variety of lenses (spherical, aspherical, plano-convex, biconvex, etc.) can be used.

Depending on the required imaging quality, individual lenses or composite lenses can be used.

The plug can be constructed in virtually any variation (bayonet closure, union nut, FC plug, etc.).

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A confocal laser microscope comprising:
an objective;
at least one laser whose illumination light is transmitted in direction of the microscope objective by at least one light-conducting fiber;
a first housing which houses displaceable collimating optics; and
a second housing which is configured to be plugged into the first housing and into which the light-conducting fiber projects, the second housing being provided, at its end remote of the fiber, with first optics for transmitting laser light exiting divergently from the fiber in the second housing in direction of the displaceable collimating optics in the first housing.

2. The confocal laser microscope according to claim 1; wherein the first optics comprise a lens.

3. The confocal laser microscope according to claim 1; wherein the first optics generate a divergent light beam, and are arranged at a distance from the end of the fiber of less than their focal length.

4. The confocal laser microscope according to claim 1; wherein at least second optics are arranged between first optics and collimating optics.

5. The confocal laser microscope according to claim 1; wherein the collimating optics comprise a stationary lens and a displaceable lens.

6. The confocal laser microscope according to claim 1; wherein the first optics generate a parallel light beam, and are arranged at the distance of their focal length from the end of the fiber.

7. The confocal laser microscope according to claim 1; wherein at least one second optics is arranged between the first optics and the collimating optics, wherein the collimating optics comprise a first stationary lens and a second displaceable lens, and wherein the second optics or the first stationary lens of the collimating optics are arranged in the parallel light beam generated by the first optics.

8. The confocal laser microscope according to claim 1; wherein the focal point of the second optics coincides with the focal point of the collimating optics for generating a parallel light beam in direction of the microscope.

9. The confocal laser microscope according to claim 1; wherein the first housing also houses a scanning head of the microscope.

10. A confocal laser microscope comprising:
an objective;
at least one laser whose illumination light is transmitted in direction of the microscope objective by at least one light-conducting fiber;
a first housing which houses collimating optics; and
a second housing which is configured to be plugged into the first housing and into which the light-conducting fiber projects, the second housing being provided, at its end remote of the fiber, with first optics for transmitting laser light exiting divergently from the fiber in the second housing in direction of the collimating optics in the first housing;
wherein:
at least second optics are arranged between the first optics and the collimating optics when the second housing is plugged into the first housing; or
the collimating optics comprise a stationary lens and a displaceable lens.

11. The confocal laser microscope according to claim 10; wherein the first optics generate a parallel light beam, and are arranged at the distance of their focal length from the end of the fiber.

12. The confocal laser microscope according to claim 11; wherein the second optics or the stationary lens of the collimating optics are arranged in the parallel light beam generated by the first optics.

13. The confocal laser microscope according to claim 10; wherein the focal point of the second optics coincides with the focal point of the collimating optics for generating a parallel light beam in direction of the microscope.

14. The confocal laser microscope according to claim 10; wherein the first housing also houses a scanning head of the microscope.

* * * * *